Aug. 9, 1960  F. B. BRAND ET AL  2,948,245
FLUID PRESSURE-RESPONSIVE APPARATUS
FOR CONTROLLING NAVIGABLE CRAFT
Filed Jan. 12, 1955  2 Sheets-Sheet 1

INVENTORS
FREDERICK B. BRAND
JOSEPH H. CHADWICK, JR.
BY
ATTORNEY

SEA PRESSURE

INVENTORS
FREDERICK B. BRAND
JOSEPH H. CHADWICK, JR.
BY
ATTORNEY

United States Patent Office 2,948,245
Patented Aug. 9, 1960

2,948,245

FLUID PRESSURE-RESPONSIVE APPARATUS FOR CONTROLLING NAVIGABLE CRAFT

Frederick B. Brand, Sea Cliff, and Joseph H. Chadwick, Jr., Levittown, N.Y., assignors to Sperry Rand Corporation, a corporation of Delaware Filed Jan. 12, 1955, Ser. No. 481,293

14 Claims. (Cl. 114—16)

This invention relates to pressure-responsive apparatus for providing an indication of departures of an object from a predetermined elevational level within a fluid medium. More particularly, it concerns the compensation of such an apparatus for performance errors caused by movement of the object about a normally horizontal axis thereof where the device is installed in offset relation to such axis.

In a submarine, for example, the apparatus may comprise a sea-pressure sensitive arrangement for generating a control signal dependent upon the displacement of the submarine from a selected depth. The depth device is generally installed for convenience and other practical reasons in a location offset a number of feet both vertically and horizontally from the vessel's roll axis. Hence, as the submerged craft rolls, the distance between the depth device and the surface of the sea is varied so as to result in the generation of an erroneous control signal. Heretofore, this error could generally be safely ignored because the roll angles encountered operationally in the average submarine were sufficiently small to render the error negligible. However, the recent development of submarines capable of comparatively high underwater speeds has altered the situation somewhat, so that it is no longer unusual for a submarine to experience roll angles from trim of twenty degrees or more in submerged turns. Accordingly, the offset-induced errors of depth control devices may now become appreciable and amount to the equivalent of several feet of depth. Therefore, where the control signal output of the depth device is employed to actuate the submarine's diving planes to maintain a highly critical periscope or snorkel depth, for example, the error can no longer be safely ignored.

A similar error problem may exist in aircraft where the elevation control device may comprise an air-pressure sensitive arrangement for generating a control signal dependent upon the displacement of the aircraft from a selected altitude. In this case, it may be inconvenient and otherwise impractical to locate the altitude device in a position other than one that is offset vertically and horizontally from at least one of the aircraft's normally horizontal axes of movement. Concededly, the offset-induced error for aircraft will be inconsequential in the ordinary case. Yet, where the aircraft is a helicopter or a lighter-than-air airship engaged, for example, in antisubmarine work demanding the strictest control of altitude while hovering above the surface of the sea, it is again evident that the error can not be ignored.

Accordingly, the present invention is directed toward the provision of a pressure-responsive elevation control apparatus compensated for the offset-induced performance errors described above. In brief, a pressure-sensitive device is employed of the type that has a portion translatable in response to changes in the pressure of fluid supplied to the device. The device is mounted in the object to be controlled at a radially-offset distance from a normally horizontal axis of object movement, and is in operative communication with a fluid medium surrounding the object, so that the movements of the object about its horizontal axis in the absence of a change in the elevational level of the object in the medium nevertheless bring about changes in the pressure sensed by the device.

In order to prevent the translatable portion from responding to the pressure changes caused by the angular movement of the object, the device, in one form of the invention, is oriented in its offset location so that its translatable portion moves directly toward and away from the horizontal axis in response to respective increases and decreases in the fluid pressure sensed thereby, and a mass is added to the translatable portion having a gravity component, in the direction of the portion's translation, that varies according to the inclination of the object about its horizontal axis. The mass is of such value that this variable gravity component prevents or substantially prevents the translation of the translatory portion that would otherwise occur due to pressure changes sensed by the device resulting from the angular movement of the object about its horizontal axis. On the other hand, translation due to pressure changes resulting from changes in the elevational level of the object is unrestricted, so that the device at all times senses such changes in object level while remaining insensitive to changes in the level of the device alone due solely to angular movements of the object about its axis.

In another form of the invention, the pressure-sensitive device may be oriented in any manner desired in its offset location. However, in this form, the mass comprises a simple pendulum movable in a plane perpendicular to the horizontal axis of object movement and resiliently forced away from its normal position of neutral equilibrium so as operationally to reside in a position orthogonal to the radius of offset of the pressure-sensitive device. Upon inclination of the object about its horizontal axis, the balanced state of the pendulum in its orthogonal position is disturbed by an inclination-induced change in the gravity-force component of the pendulum in parallel relation to the offset radius of the pressure-sensitive device. The pendulum is coupled to the movable portion of the device to transmit such gravity force changes thereto in a sense opposite to the fluid force changes in the device due to inclination-induced pressure changes, whereby the pressure-sensitive device may be rendered insensitive to such pressure changes while remaining sensitive to pressure changes while remaining sensitive to pressure changes due to variations in the elevational level of the object in its fluid medium.

A principal object of the present invention is to provide a pressure-responsive apparatus simply yet completely compensated for performance errors caused by angular movement of a fluid-immersed object about a normally horizontal axis where the apparatus is installed within the object in offset relation to the axis and in operative communication with the fluid.

Another object is to provide a pressure-responsive apparatus installed as above and having its performance errors due to the angular movement of the object compensated by a gravity-derived force rendered variable by such movement.

Other objects and features of the invention will more fully appear in the following description when read in connection with the accompanying drawings in which the subject matter is depicted in illustrative form.

Figure 1:
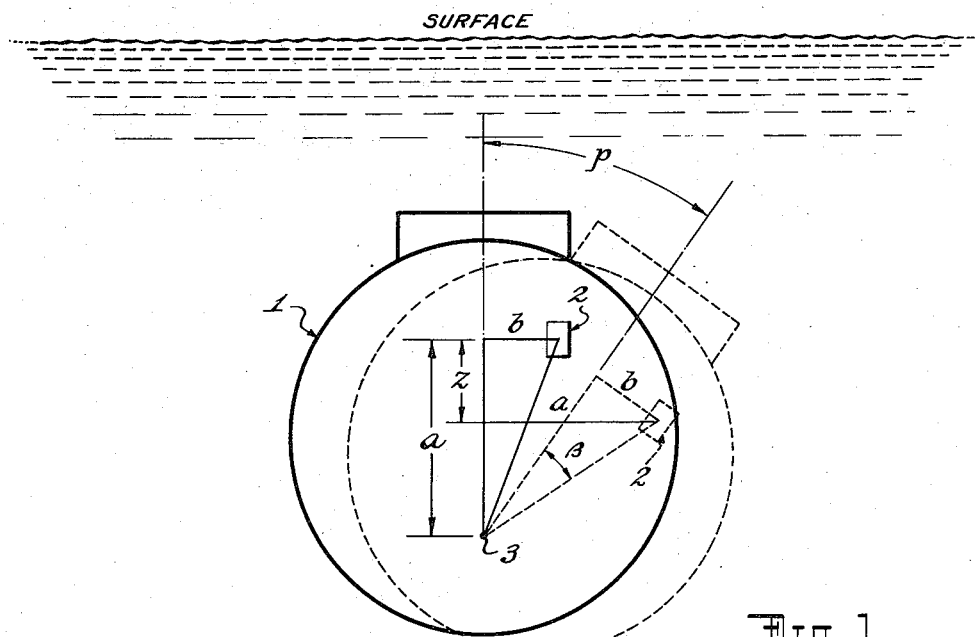
Fig. 1 is a schematic representation of the hull of a submerged submarine craft in transverse cross-section showing a pressure-sensitive apparatus mounted at a location offset both vertically and horizontally from the craft's roll axis.

In Fig. 1, the hull 1 of a submerged submarine is shown to contain a pressure-responsive apparatus 2 assumed to be in operative communication with the sea. Apparatus 2 is vertically offset from a normally horizontal roll axis 3 of the submarine by a distance "a," and is horizontally offset by a distance "b." Being pressure-responsive, apparatus 2 senses the pressure changes that accompany its vertical movement with respect to the surface of the sea. Hence, it responds when the submarine changes depth, i.e., when roll axis 3 moves vertically; and, also, due to its radial offset, apparatus 2 responds when the submarine rolls about axis 3. The latter response, therefore, is erroneous if apparatus 2 is employed to provide an indication of depth change alone.

Figure 2:
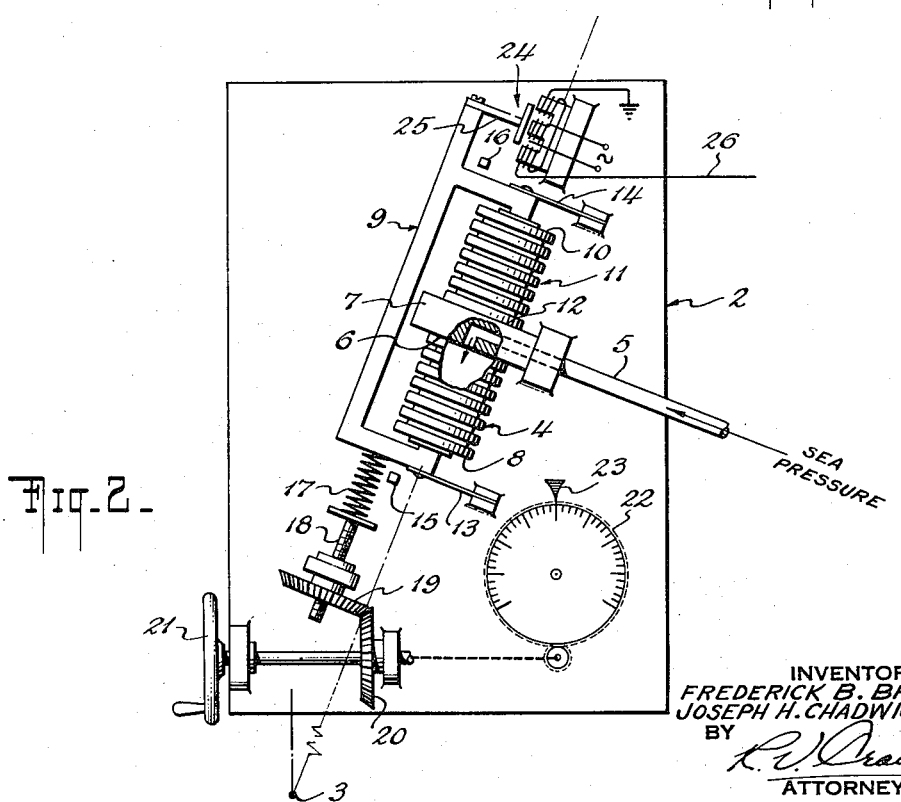
Figs. 2 and 3 are schematic diagrams of two forms, respectively, of pressure-sensitive apparatus suitable for use in Fig. 1, and embodying the present invention; and, Fig. 4 is a schematic diagram of a depth control system incorporating the apparatus of Fig. 3.

Fig. 2 illustrates a preferred form of apparatus 2 (Fig. 1) of the type that provides an electrical signal indicative of changes in depth. A sylphon bellows 4 is connected in internal communication with the sea by way of an inlet conduit 5 running from bellows 4 to any convenient place exterior of hull 1 (Fig. 1) of the submarine. Bellows 4 has a fixed end-face 6 which is mounted to a stanchion 7 rigid with the craft, and also has an end-face 8 which is movable axially of the bellows in response to changes in the sea pressure received by the latter. Bellows 4 is rendered insensitive to changes in the air pressure within hull 1 by coupling its movable end-face 8 via a yoke 9 to the movable end-face 10 of a similar bellows 11 mounted at its fixed end-face 12 to stanchion 7 in back-to-back coaxial relation to bellows 4.

The movement of yoke 9 is preferably restricted both as to direction and amount by a pair of leaf-spring supports 13, 14 and a pair of limit stops 15, 16, respectively, which are arranged to provide yoke 9 with freedom of movement substantially in parallelism with the common axis of bellows 4 and 11 over a limited volumetric range of the bellows. Bellows 11 is partially evacuated so that it tends to expand and move end-face 10 outwardly when the internal hull pressure of the craft is decreased and to contract and move end-face 10 inwardly when such pressure is increased. Bellows 4 and its end-face 8 react in an identical manner. Hence, due to the opposed mounting of the two bellows and the coupling of yoke 9, the tendency of one movable end-face to move in response to internal hull pressure variations is counteracted by an equal tendency of the other to move, thereby resulting in a net response of zero movement for such variations.

In the event, however, that there is a variation in the sea pressure supplied to bellows 4, the opposed forces are unbalanced, with the variation in sea pressure changing the degree to which yoke 9 is urged outwardly by end-face 8. Thus, if just before such variation, yoke 9 is centered between stops 15, 16, then upon such variation, it will move toward stop 15 as viewed in Fig. 2 for a pressure increase and toward stop 16 for a pressure decrease.

In order to maintain yoke 9 centered between stops 15, 16 for a given depth so that the yoke thereafter will move toward one or the other stop upon departure of the craft from this depth, a spring 17 under compression is arranged to bear against yoke 9 in a manner to transmit its resilient force to end-face 8 in an opposing sense with respect to the pressure-derived force thereon. This resilient force is adjustable by means of a lead screw 18 connected to spring 17 and driven through a pair of bevel gears 19, 20 by a rotatable handle 21.

An indicator 22, calibrated in terms of depth is rotatably positioned relative to a fixed index 23 by handle 21 simultaneously with the adjusting of spring 17, whereby to facilitate the selection of the depth at which yoke 9 is to be centered.

A departure of yoke 9 from its central position, hence a departure of the craft from the depth selected by actuation of handle 21, brings about an electrical unbalance of a two-part signal generator 24 preferably of the E-transformer type having its armature portion 25 fastened to an extension of yoke 9 and its stator portion rigid with the craft. The stator of transformer 24 is excited from a source of alternating current so that the signal produced in its output lead 26 is proportional in magnitude, until yoke 9 strikes one of stops 15, 16, to the departure of the craft from its selected depth and is of reversing phase dependent upon the direction of such departure. As long as yoke 9 remains against one of the stops, the signal output on lead 26 is limited to a maximum value, the advantage of which will become apparent in connection with Fig. 4.

As set forth in connection with Fig. 1, apparatus 2 is mounted within hull 1 with a vertical offset "a" and a horizontal offset "b" from the axis 3 of roll. In terms of the form of apparatus 2 shown in Fig. 2, distance "a" is the vertical offset of bellows 4 from axis 3 and distance "b" is the horizontal offset.

Dotted lines are employed in Fig. 1 to represent hull 1 with a positive roll angle "p." It is seen at this roll angle that apparatus 2 is vertically displaced a distance "Z" below its position for zero roll angle, while roll axis 3 remains vertically undisplaced. Hence, distance "Z" constitutes the depth error incurred due to roll angle "p" and is readily derived trigonometrically to be as follows:

(1) $$Z = a(1 - \cos p) + b \sin p$$

If apparatus 2 takes the form shown in Fig. 2, and if the gauge is tilted in its mounting so that the translatory movement of end-face 8, in response to a pressure increase, normally occurs in some direction toward roll axis 3 in a plane perpendicular to said axis, then a gravity-derived force due to the weight of the yoke assembly including armature 25 will normally be imparted to end-face 8 equivalent to an increase in pressure as follows:

(2) $$P = \frac{W}{A} \cos (B + p)$$

where:

$W$ = weight of the yoke assembly
$A$ = effective area of end-face 8
$B$ = angle between offset radius and craft's vertical
$p$ = angle of roll Equation 2 may also be expressed in terms of depth, as follows:

(3) $$Z' = \frac{W}{dA} \cos (B + p)$$

where $d$ = specific weight of sea water.

Further, Equation 3 may be expanded as follows:

(4) $$Z' = \frac{W}{dA} (\cos B \cos p - \sin B \sin p)$$

Parameters W and B may be set in such a way that Equations 1 and 4 are identical except for a constant. The values of W and B for which this occur are as follows:

(5) $$W = dA\sqrt{a^2 + b^2}$$

and (6) $$B = \tan^{-1} \frac{b}{a}$$

Equations 5 and 6 say that W should be proportional to the radial offset of bellows 4 from roll axis 3, and that the gauge should be inclined in such a way that the common axis of bellows 4, 11 coincides with the radius of offset of bellows 4, as viewed in Fig. 2. Accordingly, by properly selecting the weight of the yoke assembly and properly arranging the orientation of the gauge, bellows 4 is rendered insensitive to pressure variations due to roll and resulting from its offset location, while remaining responsive at all times to pressure variations due to the vertical displacement of roll axis 3, hence due to depth changes of the submarine. While in Fig. 2, the gravity-derived motion of the mass or yoke assembly is in substantial parallelism with the translation of end-face 8, the present compensation scheme may be embodied in an arrangement employing a mass whose tendency to move by reason of gravity is in a direction different from the translatory motion of the sea pressure bellows. Such an arrangement is illustrated in Fig. 3, now to be described as an alternative form of apparatus 2 (Fig. 1).

Figure 3:
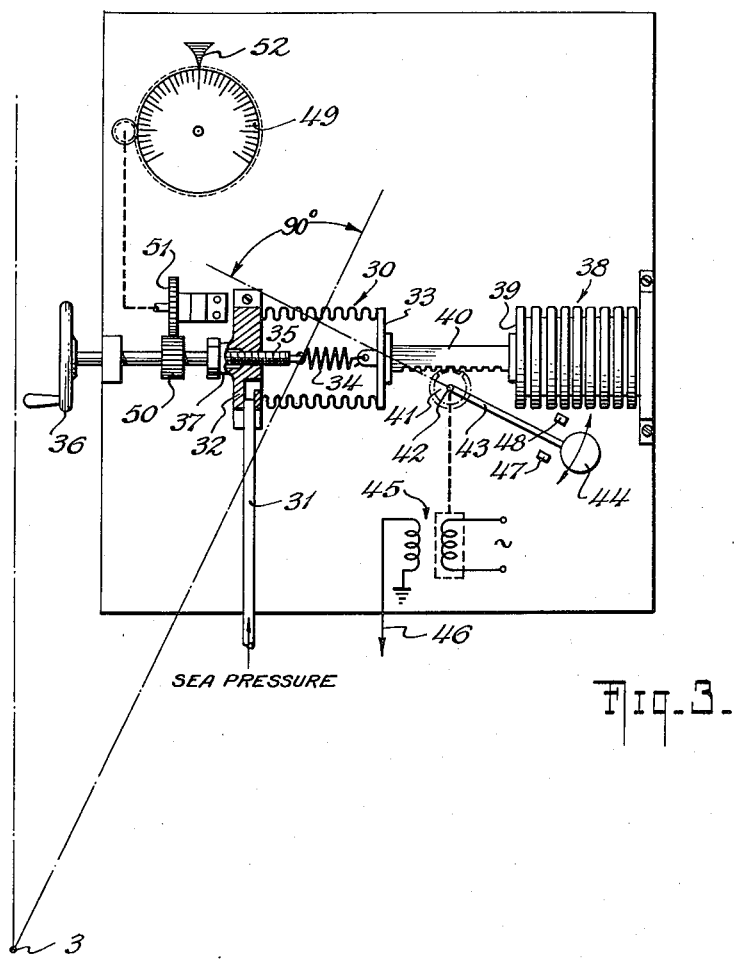

In Fig. 3, a bellows 30 is connected in internal communication with the sea by way of an inlet conduit 31 running bellows 30 to any convenient place exterior of hull 1 (Fig. 1). Bellows 30 includes a fixed end-face mounted to a stanchion 32 and an end-face 33 translatable axially of the bellows; and, in this respect, is similar to bellows 4 (Fig. 2). However, an adjusting spring 34 performing the function of spring 17 (Fig. 2) is located within bellows 30 and, therefore, is arranged to exert an adjustable tension on the sea-pressure side of end-face 33. A lead screw 35, rotatable by a handle 36, is threaded into stanchion 32 through a stuffing box 37, and its end opposite handle 36 is connected to spring 34 to provide the aforesaid adjustable tension in accordance with the handle's rotation.

Compensation for variations of pressure within the hull of the craft are again compensated in Fig. 3 by coupling the movable end-face of a partially evacuated sylphon bellows in opposition to the corresponding end-face of the sea-pressure bellows. Accordingly, a partially evacuated bellows 38, having a fixed end-face and an end-face 39 translatable axially of the bellows is arranged so that end-face 39 faces toward end-face 33 of bellows 30 and is coaxial therewith. The coupling comprises a light-weight but rigid link 40 connecting the two movable end-faces, whereby each bellows counteracts the tendency of the other to respond volumetrically to pressure variations internally of the hull.

Link 40 is provided with rack teeth on its underside which mesh with a pinion 41 having a rotatably supported shaft 42. Thus, pinion 41 and its shaft 42 are rotated according to the translatory movements of end-face 33 in response to variations in the sea pressure received by bellows 30.

In order to confine the response of end-face 33 to sea pressure variations due to changes in depth of the craft (vertical displacement of roll axis 3), whereby to prevent response to inclinations of the craft about axis 3, a pendulum comprising a rigid rod-like member 43 suspending a bob portion 44 is connected to shaft 42 for rotation therewith. It can be shown in much the same mathematical fashion employed in describing Fig. 2 that if the pendulum is free to move over a limited range in a plane perpendicular to axis 3 and is resiliently held for a selected depth in a position where its bob-suspending member 43 is perpendicular to the radius of offset of bellows 30, then the gravity-derived force acting on bob 44 in parallel relation to the offset radius and transmitted through pinion 41 to end-face 33, will vary with inclinations of the craft about axis 3 in a sense to oppose inclination-induced variations in the pressure-derived force on end-face 33. By proper selection of the weight of bob 44, the variations in the two forces may be made to exactly counteract each other so that actual movement of member 43 from its perpendicular relationship to the offset radius, hence movement of end-face 33, is confined to changes in craft depth.

By drivably connecting the rotor of a rotary transformer type of signal generator 45 to shaft 42 and exciting the rotor with an alternating current, as indicated in Fig. 3, a signal proportional to the magnitude of the depth change and of reversing phase dependent on the direction of such change, is produced on a stator output lead 46.

A pair of limit stops 47, 48, respectively, spaced equally from both sides of member 43, limit the movement of bob 44 to a range where its gravity-derived force is in substantial parallelism with the radius of offset of bellows 30. This arrangement is comparable in function to the limit stop provision of Fig. 2. Yet another device employed in the arrangement of Fig. 3 and having a counterpart in Fig. 2 is a depth-calibrated indicator 49 rotatably positioned through a pair of gears 50, 51 with respect to a fixed index 52 by actuation of handle 36 in accordance with the adjustment given to the tension of spring 34 by such actuation.

Figure 4:
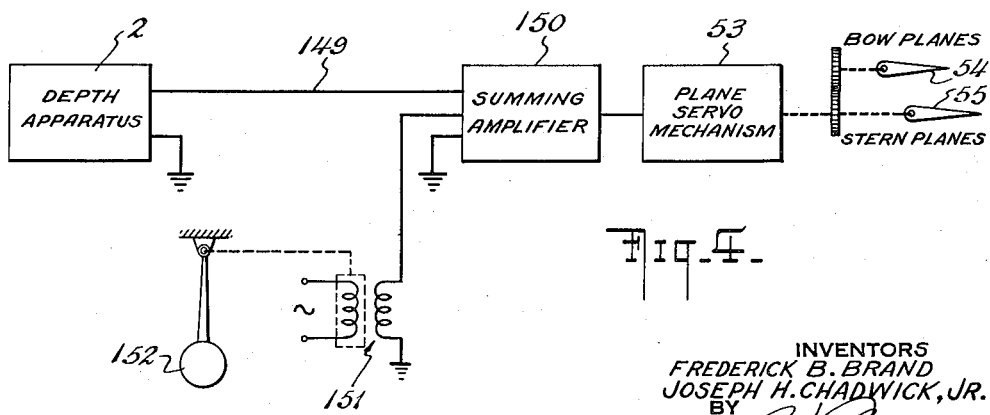

Referring now to Fig. 4, apparatus 2 (Fig. 1) is depicted as part of a system for controlling the depth of a submarine. Its output signal, whch is proportional to departures of the craft from a selected or ordered depth, is fed via a lead 149 (corresponding to lead 26 of Fig. 2 and lead 46 of Fig. 3) to the input of a summing amplifier 150 where it is algebraically combined with the output of a signal generator 151 actuated by a vertically suspended pendulum 152 having freedom of movement in a plane normal to the pitch axis of the submarine. The pendulum-derived signal from signal generator 151 is approximately proportional to the rate of change of the depth error signal on lead 149, so that the output of amplifier 150 approximately represents the sum of the depth error and its first derivative. A servomechanism 53 is connected to be energized in accordance with this sum for mechanically positioning a set of bow planes 54 and a set of stern planes 55 in opposite senses whereby to control the submarine to reach its ordered depth and thereafter maintain the same.

The sensitivity of the signal derived from pendulum 152 is so chosen that this signal exactly balances the maximum value of the depth error signal on lead 149, as determined by limit stops 15, 16 in Fig. 2 or limit stops 47, 48 in Fig. 3, at the maximum pitch attitude desired for the approach to ordered depth. By this arrangement, the desired pitch attitude is held until the depth error signal becomes less than its limited value, whereupon both signals decrease simultaneously for thereafter controlling the craft to asymptotically intercept its ordered depth.

While the detailed discussion thus far has treated two forms of pressure-responsive apparatus in illustrative terms of sea depth and installation aboard a submarine, it will be appreciated, if an average density of air is assumed and much lighter masses are employed for supplying the corrective gravity forces, that both forms may be adapted for use on board aircraft. As earlier set forth, the aircraft most suitable are those such as helicopters and lighter-than-air airships where accelerations during tight altitude maneuvering are characteristically low. The pressure in the cabins of these craft rarely departs from that external of the craft, so that the compensating bellows 11 or 38 may be dispensed with as may the respective conduits to the pressure bellows 4 or 30, in which event the respective pressure bellows are preferably sealed and partially evacuated.

It will further be appreciated that the pressure responsive apparatus may be compensated for performance errors due to its movement about any normally horizontal axis of a craft where the apparatus is installed in offset relation to such axis. Thus, instead of bellows 4 (Fig. 2) and bellows 3 (Fig. 3) being vertically and horizontally offset from an axis of roll, they may be offset from an axis of pitch, whereupon the limited movement of each mass member is constrained to take place in a plane normal to the pitch axis.

Therefore, since many changes could be made in the above arrangements and many widely different embodiments of this invention could be made without departing from the scope thereof, it is intended that all matter

What is claimed is:

1. In a pressure-responsive apparatus for a craft navigable in a fluid medium the pressure of which at any point therein depends upon the elevational level of said point, a bellows supported from a fixed end-wall thereof within said craft at a location offset both vertically and horizontally above a normally horizontal axis of craft movement, said bellows internally being in communication with said fluid medium and having a movable end-wall urged by the pressure-derived force thereagainst of said fluid medium to move away from said fixed end-wall axially of said bellows, and means including means responsive to gravity for imparting a gravity-derived force to said movable end-wall axially thereof that varies with craft inclinations about said horizontal axis in an equal and opposite sense to offset-induced variations produced by such inclinations in said pressure-derived force on said end-wall.

2. The apparatus of claim 1 wherein the means including means responsive to gravity for imparting the gravity-derived force to the movable end-wall of the bellows comprises a pendulously-mounted mass element coupled to said end-wall and movable in a plane perpendicular to the horizontal axis of the craft.

3. In a pressure-responsive apparatus for a craft navigable in a fluid medium the pressure of which at any point therein depends upon the elevational level of said point, a bellows supported from a fixed end-wall thereof within said craft at a location radially offset both vertically and horizontally above a normally horizontal axis of craft movement, said bellows internally being in communication with said fluid medium and having a movable end-wall urged by the pressure-derived force thereagainst of said fluid medium to move away from said fixed end-wall axially of said bellows, means including means responsive to gravity for imparting a gravity-derived force to said movable end-wall axially thereof that varies with craft inclinations about said horizontal axis in an equal and opposite sense to offset-induced variations produced by such inclinations in said pressure-derived force on said end-wall, resilient means for imparting a resilient force to said movable end-wall axially thereof in opposition at all times to said pressure-derived force and opposed to said gravity-derived force for craft inclinations at which the radius of offset of said bellows remains above the elevational level of said horizontal axis, and means for adjusting said resilient means whereby to maintain said movable end-wall at a given axial position for a given elevational level of said craft.

4. Apparatus for providing an indication of departures of an object from a predetermined elevational level within a fluid medium, the pressure at any point in said medium being dependent upon the vertical distance of said point from said predetermined level, said object being subject to movement about a normally horizontal axis thereof, said apparatus comprising a pressure-sensitive device in operative communication with said fluid medium and mounted within said object in a location radially offset both horizontally and vertically from said horizontal axis so that pressure changes are sensed by said device in the absence of a change of elevational level of said object due to movements of said object about said horizontal axis, said device having a mass portion movable toward and away from said horizontal axis substantially along a second axis lying in a plane perpendicular to said horizontal axis in response to respective increases and decreases in the fluid pressure sensed at said location, resilient means coupled to said mass portion for imparting a given resilient force thereto for maintaining said portion at a given radial distance from said horizontal axis at said predetermined elevational level, the mass of said mass portion being such that its gravity component in the direction of said second axis varies with movement of said object about said horizontal axis in an amount to substantially prevent movement of said mass portion due to said changes in the pressure sensed by said pressure-sensitive device resulting from said object movement, and means for providing an indication of movement of said mass portion, whereby said indication occurs for a departure of said object from said given elevational level but is substantially prevented from occurring for said object movement.

5. In an elevational control apparatus for craft maneuverable within a fluid medium, the pressure of which at any point therein depends upon the elevational level of said point, a pressure sensitive element mounted at a location offset both vertically and horizontally above a normally horizontal axis of movement of said craft, said element being in operative communication with said fluid medium and including a portion movable toward and away from said craft axis in response, respectively, to increases and decreases sensed in the pressure of said medium as said element moves vertically relative thereto, and mass means coupled to said movable portion so as to impart a gravity-derived force thereto having a component toward said craft axis that varies in dependence upon the inclination of said craft about said axis, said component increasing and decreasing as said element is borne respectively toward and away from a position directly above said axis by craft inclinations thereabout, said gravity-derived force being such that said increases and decreases in its said component are sufficient to substantially prevent any movement of said movable part due to inclination-induced pressure changes, but are ineffective to prevent movement due to changes in the elevational level of said craft.

6. In an elevational control system for a craft maneuverable in a fluid medium, the pressure at any point in said medium being dependent upon the elevational level of said point, a signal generator for providing a signal in accordance with the movements of a movable part thereof from a null output position, a pressure-sensitive element offset within said craft both vertically and horizontally from a normally horizontal axis of craft movement, said element including a translatable portion that is positioned in substantial parallelism with a line of bearing between said element and said horizontal axis in response to changes sensed in the pressure of said medium resulting from vertical movement of said element relative to said medium, means connecting said translatable portion to the movable part of said signal generator so that movement of one causes a proportional movement of the other, said connecting means including a mass member for imparting a gravity-derived component of force to both said translatable portion and said movable part in the translatory direction of the former, resilient force-producing means connected to said mass member for producing a force normally opposing said gravity component and at all times opposing pressure induced movements of said translatable portion, and means for adjusting said last-recited means so that the elevational level of said craft at which the movable part of said signal generator occupies a null output position may be selected, whereby a signal is generated in accordance with departures of said craft from said selected elevational level but is substantially prevented from being generated for movements of said craft about said horizontal axis.

7. In an elevational control system for a craft navigable within a fluid medium, a pressure-sensitive element mounted on said craft, said element being offset both vertically and horizontally from a normally horizontal axis of craft movement, said element including a translatable portion in communication with said fluid medium and arranged to be positioned in substantial parallelism with a line of bearing between said element and said horizontal axis in response to changes in the pressure-derived force imparted thereto resulting from vertical movement of said element relative to said medium, mass means coupled to said translatable portion for imparting a gravity-derived force component thereto in substantial parallelism with said line of bearing, said mass means being such that said gravity component varies equally and oppositely in relation to variations produced in said pressure-derived force due to inclinations of said craft about said horizontal axis of movement, resilient means coupled to said translatable portion for imparting a resilient force thereto equal and opposite to the sum of said gravity-derived force component and the pressure-derived force on said translatable portion at a predetermined elevational level of said craft thereby to maintain said translatable portion at a given position at said level as long as said sum remains constant, and means for providing a signal dependent on movement of said translatable portion away from said given position thereof.

8. In depth control apparatus for a submarine craft, a pressure sensitive element mounted at a location offset both vertically and horizontally above a normally horizontal axis of movement of said craft, said element being in operative communication with said pressure medium and including a portion movable toward and away from said craft axis in response, respectively, to increases and decreases sensed in the pressure of said supporting medium as said element moves vertically relative thereto, and mass means coupled to said movable portion so as to impart a gravity-derived force thereto having a component toward said craft axis that varies in dependence upon the inclination of said craft about said axis, said component having a maximum value when the craft is so inclined as to bring said offset element directly above said axis and having a value for all inclinations that prevents said movable portion from responding to pressure changes resulting from vertical movements of said element due solely to inclinations of said craft about said axis.

9. In a submarine, a depth control device radially offset both horizontally and vertically from a normally horizontal axis of said submarine, said device comprising a bellows, means connecting the interior of said bellows to the sea proximate to the hull of the submarine, mounting means for fixedly supporting said bellows at one end-face thereof, the other end-face being movable axially of said bellows in response to variations sensed by said device in the pressure of the sea, a mass element coupled to said movable end-face so as to be positioned according to movements of the latter, signal generating means for supplying a control signal according to departures of said mass element from a null position thereof, and adjustable resilient means connected to said mass element for imparting a resilient force thereto urging the same to move against the pressure exerted by the sea on said movable end-face whereby to select a value of said sea pressure that will cause said mass element to maintain said null position, said massive element being of such mass and having its path of movement so directed with respect to the submarine's vertical that a change in depth of the offset depth controller due to movement of the submarine about its horizontal axis urging said mass element away from its null position is substantially exactly counterbalanced by a simultaneous change in the gravity component of said mass element along said path of movement thereof.

10. In a submarine, a depth control device radially offset both horizontally and vertically from a normally horizontal axis of said submarine, said device comprising a bellows in operative communication with the sea proximate to the hull of said submarine, mounting means for fixedly supporting said bellows at one end-face thereof, the other end-face being movable axially of said bellows toward and away from said submarine axis in response respectively to increases and decreases sensed by said device in the pressure of the sea, a mass element coupled to said movable end-face so as to be positioned according to movements of the latter, signal generating means for supplying a control signal according to departures of said mass element from a null position thereof, and adjustable resilient means connected to said mass element for imparting a resilient force thereto urging the same to move against the pressure exerted by the sea on said movable end-face whereby to select a value of said sea pressure that will cause said mass element to maintain said null position, said mass element being of such mass and having its path of movement so directed with respect to the submarine's vertical that a change in depth of the offset depth controller due to movement of the submarine about its horizontal axis urging said mass element away from its null position is substantially exactly counterbalanced by a simultaneous change in the gravity component of said mass element along said path of movement thereof.

11. In a system for providing an indication of departures of a normally horizontal maneuvering axis of a submarine craft from a preselected depth in the sea, a pressure-sensitive device in operative communication with the sea and mounted within said craft in a location radially offset both horizontally and vertically from said maneuvering axis so that pressure changes are sensed by said device in the absence of a change of depth of said maneuvering axis due to movements of said craft about said axis, said device having a mass portion translatable toward and away from said maneuvering axis along an axis lying in a plane perpendicular to said maneuvering axis in response to increases and decreases respectively in the sea pressure sensed at said location, resilient means coupled to said mass portion for imparting a given resilient force thereto for maintaining said portion at a predetermined radial distance from said maneuvering axis at said preselected depth, the mass of said mass portion being such that its gravity component in the direction of said translation axis varies with movement of said craft about said maneuvering axis in an amount to prevent axial movement of said mass portion due to said changes in the pressure sensed by said pressure-sensitive device resulting from said craft movement, and means for providing an indication of movement of said mass portion, whereby said indication occurs for a departure of said maneuvering axis from said given depth but is prevented from occurring for said craft movement.

12. In a depth control system for providing an indication of the displacement of a navigable submarine craft from a preselected depth in the sea, a bellows mounted within said craft and having an end-wall movable along a translatory axis toward and away from a normally horizontal axis of movement of said craft in response to increases and decreases respectively in the depth of said craft, the interior of said bellows being in communication with the sea and said bellows being both vertically and horizontally offset from said craft axis whereby the force of sea pressure on said end-wall varies at constant depth of said craft with movement of the latter about its said horizontal axis, means having a given mass connected to said end-wall, said mass being of such value that its gravity component in the direction of said translatory axis varies with movement of said craft about its said horizontal axis in an amount to counteract the axial-movement-induced variations in said pressure-derived force on said end-wall, resilient means coupled to said end-wall for imparting a resilent force thereto equal and opposite to the sum of said gravity component and said pressure-derived force at said preselected depth, and means for providing an indication of movement of said end-wall, whereby said indication is prevented from occurring except for an actual displacement of said craft from said preselected depth.

13. In a depth control system for a navigable submarine craft, a bellows communicative internally with the sea adjacent said craft and externally with the atmosphere within said craft, said bellows having one end-wall fixed to the craft and a second end-wall movable along a translatory axis toward and away from a normally horizontal axis of movement of said craft in response to increases and decreases, respectively, of the force imparted to said movable end-wall due to changes in the sea pressure within said bellows resulting from vertical movement of said bellows relative to the sea, said bellows being both vertically and horizontally offset from said horizontal craft axis so that it moves vertically relative to the sea with movement of said craft about said horizontal axis, mass means coupled to said movable end-wall for imparting a gravity-derived force component thereto in substantial parallelism with said translatory axis, said component being inherently variable according to the movement of said craft about said horizontal axis, said mass means being of such value that said component by its own variation substantially counteracts all variations in said pressure-derived force resulting from said axial craft movement, resilient means coupled to said movable end-wall for imparting a resilient force thereto equal and opposite to the sum of said gravity component and said pressure-derived force at a predetermined depth of said craft so as to maintain said movable end-wall at a given position at said depth, and means for providing an indication of movement of said movable end wall from said given position thereof, whereby said indication is prevented from occurring except for an actual departure of said craft from said predetermined depth.

14. In a system for providing an indication of departures of a normally horizontal maneuvering axis of a submarine craft from a preselected depth in the sea, a pressure-sensitive device in operative communication with the sea and mounted within said craft in a location radially offset both horizontally and vertically from said maneuvering axis, so that pressure changes are sensed by said device in the absence of a change of depth of said maneuvering axis due to movements of said craft about said axis, said device having a portion translatable toward and away from said maneuvering axis along an axis lying in a plane perpendicular to said maneuvering axis in response to increases and decreases respectively in the sea pressure sensed at said location, a mass element connected to said translatable portion for movement therewith along said axis of translation, resilient means coupled to said translatable portion for imparting a given resilient force thereto for maintaining said portion at a predetermined radial distance from said maneuvering axis at said preselected depth, the mass of said mass element being such that its gravity component in the direction of said translation axis varies with movement of said craft about said maneuvering axis in an amount to prevent axial movement of said translatable portion due to said changes in the pressure sensed by said pressure-sensitive device resulting from said craft movement, and means for providing an indication of movement of said translatable portion, whereby said indication occurs for a departure of said maneuvering axis from said given depth but is prevented from occurring for axial movement of said craft.

References Cited in the file of this patent
UNITED STATES PATENTS

| | | |
|---|---|---|
| 2,263,553 | Borracci | Nov. 25, 1941 |
| 2,567,212 | Klopp | Sept. 11, 1951 |
| 2,571,722 | Jones | Oct. 16, 1951 |
| 2,579,220 | Vine | Dec. 18, 1951 |
| 2,693,921 | McKissack et al. | Nov. 9, 1954 |
| 2,713,316 | Leonard | July 19, 1955 |
| 2,744,485 | Karig | May 8, 1956 |